Patented Feb. 3, 1953

2,627,466

UNITED STATES PATENT OFFICE 2,627,466

METHOD OF PRODUCING SKINLESS FRANKFURTERS

Jean L. Lewis, Baltimore, Md., assignor of one-third to Sidney Feinberg, and one-third to Benjamin H. Fogelson, both of Roselle, N. J.

No Drawing. Application May 23, 1950, Serial No. 163,785

16 Claims. (Cl. 99—109)

This invention relates to an improved method of producing skinless frankfurters, sausages and similar comestibles, and is a continuation in part of prior application Serial No. 147,580, filed March 3, 1950, now abandoned.

The methods of producing skinless frankfurters currently employed in this industry comprehend a common general series of steps or operations. In typical practice the sausage or meat emulsion is charged to a stuffer and is extruded under pressure from a stuffing horn into transparent regenerated cellulose casings which are supplied to the sausage makers by casing manufacturers. As each individual casing is loaded or stuffed, it is tied to the end of another previously stuffed casing to produce a continuous string of stuffed casings. Such string is then passed through a suitable linking machine and the lengths of the linked frankfurters are festooned over supporting frames or racks on which they are maintained during certain of the later processing operations.

The racks or frames of the linked meats may be stored temporarily and are then transferred to the smoke house, and, in the generally employed method are smoked at an elevated temperature until cured. After such smoke curing, the frankfurters, while still retained on the frames, are placed in cookers where, in typical practice, they are cooked in an atmosphere of water vapor at a temperature of about 150° F. for swelling and plumping. Alternatively, the frankfurters may be cooked in hot water. After such cooking, the racks are removed and the frankfurters are sprayed with cold water, drained and then chilled. After such chilling the casings are manually stripped off the frankfurters. Other sausage products are made by similar and related processes. Certain types of sausage products are sold uncooked, and some or all of the smoking, cooking and washing operations described above may be omitted.

It is apparent that the step of manually stripping the casings presents substantial, inherent disadvantages. This step consumes time and labor and commensurately adds to the cost of production. Additionally, as in any process involving manual contact with foodstuffs, it increases the danger of contamination. A further major disadvantage of knife stripping the casings is the loss of approximately 2% of the frankfurters handled, caused by cutting or otherwise damaging the frankfurter or sausage product.

In the conventional method of producing skinless frankfurters, the material used for the casing comprises essentially a tube of regenerated cellulose which may be and usually is plasticized with a suitable plasticizer. There is also employed for this purpose various modifications of regenerated cellulose tubing such as plasticized laminated products like cellophane. In prior practice all such casing materials were, for all practical purposes, hydrophobic or at any rate essentially hydrodural, that is to say, they were resistant to the action of water and aqueous fluids and could be removed only by physically stripping off the casing.

The present invention is based on the concept eliminating such manual stripping and of establishing what in effect is an automatic method of removing the casing from frankfurters and similar comestible products, without manual or mechanical action.

This concept is effectuated by utilizing for the casing a material which differs markedly in its physical or physicochemical characteristics from the casing material heretofore employed. Whereas the casings employed in the past have been hydrodural, that is of sufficient resistance to liquid water so that they retained their entity and strength when contacted with water, hot or cold, the casing materials comprehended in the present invention are advisedly chosen because of their hydrolabile characteristics, that is to say, of such properties that they retain their form and continuity during the stuffing, linking, smoking and cooking operations but are of such a selected sensitivity to cold or hot aqueous fluids or to elevated temperatures in the presence of aqueous fluids such that they dissolve, disintegrate, tenderize or plasticize sufficiently that they may be removed from the sausage by immersion in or spray impact with aqueous fluids.

With this concept in mind, it will readily be appreciated that there are a number of different specific materials which may be employed in the novel process. The essential requirements of such casing material are that it forms a film of sufficient tenacity and strength so as to function effectively as a holding casing for the extruded sausage filling during the stuffing, linking, curing and cooking steps and that it possesses such hydrolabile or thermolabile properties that it may readily be removed by the mediate or immediate action of water and aqueous fluids or by selected elevated temperature in the presence of aqueous fluids. Such film forming material obviously should be non-toxic and preferably should be compatible with readily available non-toxic plasticizers. While substantial transparency is perhaps advantageous, it manifestly is not essential since, in respect to the end product, i. e., the skinless frankfurter, the material in effect functions as a temporary, water vapor and smoke permeable, disposable mould.

It is thus an object of the invention to devise a novel method of curing and cooking meat products in a conformed shape.

Another object of the invention is to provide an improved method of producing skinless frankfurters.

Yet another object is to devise a process of making skinless frankfurters wherein the step of manually or mechanically removing the casing from the cured frankfurter is obviated.

A further object is to provide a novel hydrolabile casing for frankfurters which may be automatically removed during the process of producing skinless frankfurters without manual or mechanical action.

A further object is to eliminate manual handling of skinless frankfurters and similar shaped meat products during the step of removing the casing.

A further object is to produce frankfurter and other sausage products of improved flavor and taste.

These and other equally important and related objects will be seen to be achieved upon a consideration of the novel process of the invention.

As intimated hereinbefore, there are a number of film-forming materials sufficiently sensitive to water, aqueous fluids or heat in the presence of water or aqueous fluids, which satisfy the criteria for a satisfactory casing material to be employed, such, for example, as suitably hydrolized polyvinyl acetate and other polyvinyl esters; polyvinyl methyl ether and other polyvinyl ethers; certain types of methyl cellulose, ethyl cellulose, hydroxyethyl cellulose, cellulose acetate, and other cellulose esters and ethers; carboxymethyl cellulose and other acidic derivatives of polysaccharides, vinyl, and acrylic polymers such as oxidized cellulose, alginic acid, pectic acid, cellulose acid succinate, cellulose acetate acid phthalate, the acid succinates of hydrolyzed polyvinyl acetate, polyacrylic acid, etc.; the sodium or other water soluble salts of the aforementioned acidic polymeric materials; certain polymers and copolymers of amino acids and amides such as nylon type FF8 or FM8001 and FM6501; certain natural proteins such as gelatin and agar agar; and any other natural or synthetic film forming materials similar to any of the above in their physical and chemical properties. Some of the above described materials may be used in their pure state, however in most instances it is advisable and frequently necessary to modify them physically or chemically to render them suitable or more suitable for use as casing materials fulfilling the objects of the invention.

In order to more clearly explain the invention, the process will be described utilizing a preferred casing material, namely, one fabricated from suitably hydrolyzed polyvinyl acetate. This material serves well for the intended use, it readily forms films of good physical characteristics; it is free from color, taste and odor; it is non-toxic and its aqueous ability or solubility can be controlled within desired limits by controlling the extent of hydrolysis and by consequent addition of molecular side chains or cross-linking of molecular chains. As is known, when polyvinyl acetate is hydrolyzed in the presence of acid or alkali catalysts polyvinyl alcohol is formed. The molecular weight of the polyvinyl alcohol produced can be controlled by varying the molecular weight of the polyvinyl acetate starting material. The degree of hydrolysis of the polyvinyl acetate can be varied to produce different types of the alcohols. In the completely hydrolyzed type less than 1.5% of the original acetyl groups of the acetate remain in the polyvinyl alcohol which is produced. When the hydrolysis is terminated short of this, polyvinyl alcohols of the partially hydrolyzed type are formed. If the degree of hydrolysis is below about 70% the polyvinyl alcohols produced are water insoluble.

According to the present invention, as noted, a suitably hydrolyzed polyvinyl acetate constitutes a very effective casing material. Since the film strength increases with the molecular weight of the alcohol, it is apparent that the strength of the ultimately formed casings varies considerably. For the purpose of the invention a fully hydrolyzed polyvinyl acetate in which, for example, approximately 98.5% of the acetyl groups have been hydrolyzed serves very effectively. Such materials are readily available on the market under the trade names "Elvanol 71–24, Elvanol 72–51, Elvanol 90–25 and Elvanol 91–65" (Du Pont Co.). These materials differ in the process used for the hydrolysis of the polyvinyl acetate starting material, and in their molecular weight. There are slight differences in the degree of hydrolysis due to the differences in processes between the 70 series and 90 series, however these differences may be considered to be negligible for practical purposes. Lower molecular weight polymers of the same series such as Elvanol 70–05 may also be used, but are less desirable because of inferior strength. Although any of the four above suggested Elvanols may be used in the pure state, with or without a heat cure following the formation and drying of the tubular casings, it is desirable to modify the basic material to secure optimum properties. A preferred casing can be made of Elvanol 71–24, although as stated before Elvanol 72–51, Elvanol 90–25 or Elvanol 91–65 may be used with equal or superior results.

In order to fabricate a preferred continuous seamless tube of the desired properties to serve as a frankfurter or sausage casing fulfilling the objects of this invention, Elvanol 71–24 is dissolved in water to a clear uniform viscous solution of approximately 17% solids content. A suitable plasticizer such as, for example, glycerine, is added, a desirable proportion being 10 parts per hundred parts of Elvanol. A suitable cross-linking agent as, for example, citric acid, is also added, a desirable proportion being 1 part per hundred parts of Elvanol. It should be noted that the plasticizers such as ethylene glycol, propylene glycol, polyethylene glycols and other comestible plasticizers may be substituted for glycerine. It should equally be noted that other cross-linking agents such as tartaric acid, various other polycarboxylic acids, hydroxypolycarboxylic acids and other comestible cross-linking agents for Elvanol may be substituted for citric acid.

The solution of Elvanol 71–24, glycerine, and citric acid should be thoroughly mixed to produce uniformity of solution and dispersion. Filtration is highly desirable at this point, prior to fabrication of the tubular casing. The tubular casing may be formed by extruding the formulated Elvanol solution through a suitable annular orifice into an acetone bath, or any other suitable dehydrating or coagulating bath. The tubular casing is then dried. As will be appreciated, the plasticizer may be added to the tubing after extrusion and coagulation of the Elvanol solution if preferred.

The plastic tubular material thus produced is tough, flexible and abrasion resistant, and is thus particularly well adapted to the purposes of the invention. The thickness of the tubular casing may be varied by varying the concentrations of the Elvanol solutions, or by adjusting the aperture of the annular extrusion orifice. This second procedure is preferred since it is desirable to keep the solids contact of the Elvanol solutions as high as possible for ease of handling the coagulated tubular casing. The film thickness of the completed tubular casings may be varied between 0.001 inch and 0.003 inch. For the purposes of the invention, a film thickness of 0.002 inch is desirable.

Further improved properties may be imparted by curing the dried extruded tubular casing described above for a period of about 60 minutes or more at a temperature of approximately 250° F. The time and temperature of the curing operation may be varied considerably to produce equally desirable effects.

In carrying out the improved process a hydrolabile casing such as that just described is stuffed in the conventional manner with the sausage meat which is extruded into the casing from a stuffing horn or equivalent feeding member. For accurate control of the quantity of sausage meat emulsion stuffed into the casing, it is desirable to stuff at as low a temperature as may be practicable. The casings should preferably be stored in a dry atmosphere prior to stuffing. It may be noted after stuffing that the casing swells and softens to a certain extent and that the freshly stuffed casing may assume a somewhat wrinkled effect. This effect, however, is only transitory since full recovery of the casing occurs during the following curing operation and the frankfurters or sausage products produced show no ill effects from this occurence.

Each such stuffed casing is tied to a previously stuffed casing and the loaded casings are drawn through the linking machine and the linked lengths are festooned on the supporting racks. As in current practice the racks are transported to the smoke house and are smoked at any selected elevated temperature to cure the meat to the desired extent. After curing, the racks are then transferred to a cooker where they are cooked preferably in an atmosphere of water vapor at a temperature of about 150° F. The casings are normally tenderized by this cooking operation and may not remain linked together after a short exposure in the cooker. It is desirable therefore, to place wire trays under the sausage filled racks to catch any frankfurters or sausage products which may drop off the racks.

There are several equally effective methods of removing the casing at the completion of the various curing and cooking operations. A preferred method is to dip the cooked frankfurters or sausage products into boiling water, or water at approximately 200° F. or above. Under these conditions, the casings disperse and dissolve rapidly in the water; an immersion period of approximately 15 seconds or more being usually sufficient. To insure complete separation of the casing and plasticizer from the frankfurter or sausage product, an immersion in cold water, or a cold water rinse under a directed water spray is then desirable. The product thus freed of the casing is then dried. After drying the skinless frankfurter or sausage product may be packaged in any suitable manner.

It will be appreciated that the process of automatically removing the casing may be varied considerably, and in addition, that the cooking operation may be simplified in view of the succeeding automatic stripping operations. For example, within a relatively short period of time after the cooking step in water vapor at 150° F., and before the casing which is partially tenderized as a result of such cooking has cooled, hardened or dried, the frankfurters may be stripped of their casings by immersion into cold agitating water for a period of one to three minutes or more. The casings do not fully dissolve under these conditions, however they break up and disintegrate sufficiently to be separated from the meat product during the immersion period or during the following rinse under directed water spray. It will be seen, therefore, that the temperature of the contacting water is immaterial if the cooked frankfurters are subjected to water immersion immediately upon, or shortly after completion of the cooking operation. It should also be noted that storage, cooking, hardening or drying of the cased frankfurters after removal of the cooked frankfurters from the hot water vapor cooker have no effect upon the automatic stripping operation when performed in water above approximately 200° F., and that completely satisfactory results are achieved even after long storage and standing of the cooked frankfurters.

Since the preferred method of automatically stripping the casing from the cooked frankfurters involves water immersion, more preferably hot water, the hot water vapor cooking operation may be omitted if desired, and the swelling and plumping desired in the cooked frankfurter may be obtained simultaneously with the stripping of the casing. In such a case the frankfurter would be more thoroughly cooked in the smoke house prior to hot water immersion. A further variation may be had by completing the cooking operation in the same operation as the stripping operation during the hot or boiling water immersion. A further variation may be had by initiating the stripping operation in the hot water vapor cooker. In this case, additional steam may be admitted into the cooker, raising the temperature to approximately 180° F. to 220° F. or more, under which conditions the cased frankfurters will completely separate from themselves and drop into the receiving trays below, and the casings will substantially dissolve and be removed from the frankfurters. In this instance only a following cold water rinse or spray is necessary to completely free the frankfurter of any retained casing. It is to be observed that these and many other variable procedures of smoking, cooking and stripping the frankfurters and sausage products may be used in the application of these processes.

It will, of course, be appreciated that the use of extremely water-sensitive polymers is not advisable because of the adverse effects caused by contact with the meat fill, hence the casing should substantially retain its entity during the processing through the cooking step.

With this limitation in view, it will be understood that there is a wide permissive choice of film-forming hydrolabile plastics for forming the casing material. These can be chosen and used alone or in suitable mixtures or formulations with or without other water soluble or insoluble strength imparting components to produce a casing material suitable for any particular sausage making operation. There are readily available on the market film-forming, water soluble, non-toxic plastics which range in water solubility from ready solubility to sparing solubility. As pointed out previously, the highly water soluble or water sensitive plastics like dimethoxy cellulose and hydroxyethyl cellulose are too sensitive to water and are not preferred for the proposed use, however, lowered solubility can be achieved by employing partially esterified or otherwise modified derivatives of these enumerated substances. Formulations comprising mixtures of plastic materials of varying water solubility obviously can be employed to produce casing materials which will dissolve, disperse or tenderize to a different degree or extent when subjected to water immersion or dispersion after the cooking operation.

It will be understood also that the casing material may include in its formulation film-forming material which is soluble or dispersible in either hot or cold water such, for example, as sodium carboxymethyl cellulose. Aqueous solutions of this compound, on evaporation, produce colorless tough transparent films. It may be readily plasticized with glycerol, glycerine and the like to confer the desired flexibility for the purpose at hand. It is compatible in solution with other less water soluble or water dispersible materials such as polyvinyl alcohol, gelatin, casein and the like, and thus can be used in a wide range of formulations for producing the hydrolabile sausage casings contemplated herein.

A desirable casing within the scope of this invention may be made of a suitable ethoxy derivative of cellulose. An ethyl cellulose of approximately ⅓ ethoxy substitution can be prepared which is completely soluble in water between 32° F. and 39° F., swells in water between 40° F. and 59° F., and which is completely unaffected by water or water vapor contact at temperatures above 60° F. It will readily be seen that a casing of this material, plasticized if desired, may be handled in the exact manner as existing cellulose casings throughout all the operations involved in the preparation of frankfurters, with the limitation of a minimum stuffing temperature of approximately 60° F. Any or all variations of frankfurter smoking and cooking operations may be employed with this ethyl cellulose casing. Removal of the casing occurs on immersion of the cased frankfurter in cold water at a temperature no higher than 39° F. Standing or storage of frankfurters cased in this ethylcellulose material has no effect upon the efficiency of the stripping operation in cold water. As in prior discussed processes, a directed water spray is desirable to completely free the cooked frankfurter of any retained particles of casing.

While the previously described embodiments of the invention involve the utilization of water soluble or water dispersible film-forming material, it is to be understood that the invention is not limited to plastics which are sensitive to water as such. This is to say that within the scope of the invention, the material used for casing may, if desired, be one which is insoluble in water but which is solubilized or tenderized by various aqueous fluids. For example, the casing may be made of a film-forming material which is insoluble in water but which is soluble in aqueous alkaline solutions, acidulated aqueous solutions or aqueous solutions containing any desired amounts of water miscible organic solvent, such as for example, aqueous alcohol solutions. Thus film-forming material which is insoluble in water but which is soluble in or dispersible in mild alkaline solutions may be employed. In this event, as will be understood, the casing would be removed by immersion or spraying the cured cooked frankfurter with a suitable alkaline solution.

Such modified casing material which is removable under the action of alkaline solutions may be, for example, comprised of carboxymethyl cellulose, alginic acid, pectic acid, oxidized cellulose, polyacrylic acid, and certain acid ester derivatives of high polymers such as cellulose, cellulose acetate, hydroxyethyl cellulose, starch and polyvinyl alcohol. These latter water insoluble, aqueous alkali soluble derivatives are essentially esters of dicarboxylic acid in which one carboxyl of the acid is esterified with the polymeric substance, the other acid group being free. All the above compounds present weakly acidic properties and form alkali salts which are water soluble and hence can be washed off with an aqueous alkaline solution such as a solution of sodium carbonate or bicarbonate. Many of these compounds similarly are soluble in aqueous alcohol solutions. Typical substances of the acid ester derivatives generally described above comprise the acid succinate of amylose, hydroxyethyl cellulose and polyvinyl alcohol. Similarly, derivatives of other dicarboxylic acids may be used such as the phthalic acid derivatives of these equivalent polymeric substances.

The synthesis of these polymeric acid ester derivatives is in general most simply accomplished by the addition of the plastic substance to be esterified to a mixture of pyridine and the acid anhydride of the esterifying acid. This general synthesis will be understood and appreciated from a consideration of the production of one of the effective members of this series, namely, the acid succinate of hydroxyethyl cellulose. This compound may be produced by adding, for example, 20 grams of succinic anhydride to 120 cc. of pyridine and then adding 20 grams of hydroxyethyl cellulose. This reaction mixture is heated on a steam bath for about 24 hours after which it is diluted with water. Purification of the compound may be effected by washing with water, dissolving in alcohol and reprecipitating in water, or by dissolving in weak alkali and precipitating in acidulated water.

In this synthesis the pyridine combines with the free carboxy group of the dicarboxylic acid when the anhydride is split upon the esterification of an OH group of the cellulose chain. This results in a cellulose ester of a dicarboxylic acid in which only one of the carboxy groups is directly linked to the cellulose chain while the other is free. As may be expected, the compound is mildly acidic in character having a pH of about 5. As noted, the ability of this compound to dissolve in a weak alkali solution is due to this acidic character.

Using these acidic alkali soluble materials in the process of the invention, the solid plastic compound may be dissolved in alcohol, extruded through an annular orifice into a coagulating bath of water to form the tubular casing material or, alternatively may be dissolved in a weak alkali solution and extruded into a dehydrating or dealcoholing bath and then treated in a bath of acidulated water. When carboxymethyl cellulose or alginic acid are employed for the casing materials, these may be coagulated in an acetone bath. However, because of its solubility therein, hydroxyethyl cellulose acid succinate should not be treated with acetone. It will be understood that that type of coagulation should be chosen which will insure a high gel strength in the extrusion. Suitable plasticizers, either water soluble such as glycerine or glycols, or alkali soluble plasticizers such as certain esterified products of dicarboxylic acids and dihydroxy alcohols, may be used to modify the physical characteristics of the casings. In the step of removing the casing, after smoking and cooking operations, the cased meat product is immersed or sprayed with an aqueous alkali solution of sufficient strength to dissolve and/or tenderize the casing to present ready removal in the manner described. It is to be noted that the acid succinate of hydroxyethyl cellulose forms a pliable, non-tacky film which has good dry abrasion resistance. It may be incorporated in other selected compatible film-forming plastic material and plasticized to provide casings of the desired physical characteristics which can be dissolved or disintegrated under the action of aqueous alkali.

The acid phthalate of hydroxyethyl cellulose may be similarly prepared and displays the same general physical characteristics of the corresponding succinate.

Such casing materials which are water insoluble, but removable under the action of aqueous alcohol solutions include several of the acid ester derivatives described above, such as hydroxyethyl cellulose acid succinate, hydroxyethyl cellulose acid phthalate, polyvinyl alcohol acid succinate etc., and other materials such as polyvinyl acetate, partially hydrolized polyvinyl acetate such as Elvanol 20-105, Nylon FF8 or FM8001, and Nylon 6501 or FM6503. These materials may be extruded into casings by dissolving in alcohol, or aqueous alcohol solutions, and extruding into a coagulating bath of water. Where applicable, the materials may be dissolved in dilute alkali solutions and extruded into acidulated water. These materials may be placticized, if desired, by the same types of plasticizers described above for application with alkali soluble casings. In the step of removing the casing from the smoked and cooked frankfurter, the cased meat product is immersed in an aqueous alcohol solution of sufficient alcohol content, and at a satisfactory temperature to rapidly dissolve or tenderize the casing. Completion of the casing stripping operation may be effected by a following cold water spray.

As indicated previously, the broader concepts of the invention may be effectuated by employing for casing a material which is water insoluble but which is thermolabile or thermoplastic and which, after the curing and cooking operation, can be removed by heating the skin or casing in a water bath or in an atmosphere of water vapor or steam at a temperature above normal processing temperatures and sufficiently high to soften the casing and cause it to melt or flow off or tenderize sufficiently so that it will break, disintegrate or disperse in turbulent water. For this type of operation a wide range of thermoplastic materials may be used. A typical example of such heat softened material is Nylon FF8 or FM8001 which softens in a temperature range of approximately 170° F.-212° F. in aqueous fluids to a form which can readily be removed from the frankfurter. This material is inherently tacky and adhesive and has a tendency to remain attached to the frankfurter or other sausage product during the normally applied stripping processes described in this invention. It is preferable, therefore, to compound this material with such plasticizers and modifiers which will reduce or eliminate this objectionable characteristic. These and similar casing materials may be removed from smoked and cooked frankfurters by exposure to hot water vapor or steam at temperatures of 170° F. to 220° F. or higher or immersing in hot water between 170° F. and 212° F. Complete removal of particles of casing remaining adhered to the meat product may be effected by exposing them to a following directed water spray.

It will now be appreciated that the process of the invention presents many advantages. It provides an eminently simple method of effectively removing the casing from the cured and cooked frankfurter and similar meat products by the simple expedient of dissolving, dispersing or tenderizing the casing material with selected aqueous solutions, or by heat in the presence of aqueous fluids. This operation is, in effect, automatic in operation and thus reduces to the optimum the labor heretofore required for the casing stripping operation. It further eliminates losses of sausage products which are invariably damaged by manual knife stripping or mechanical action. In addition to the foregoing, juicier frankfurters of improved flavor and taste are obtained by the use of several of the suggested casings, specifically with the preferred Elvanol casing. The plastic materials employed for the casing are, moreover, readily available and economical. While preferred modifications of the invention have been described, it is to be understood that these are given didactically to illustrate the underlying principles involved and not as limiting the useful scope of the invention to the several descriptive embodiments.

I claim:

1. A method of producing skinless frankfurters which comprises stuffing a hydrolabile plastic tube with a sausage mix, smoking and cooking the sausage encased in the said tube and contacting the casing with an aqueous liquid for a time sufficient to partially disintegrate the casing and then removing the casing.

2. A method of producing skinless frankfurters which comprises stuffing a hydrolabile plastic tube with a sausage mix, curing and cooking the mix while enclosed in the tube, and then disintegrating and washing off the tube with an aqueous liquid.

3. A method of producing skinless frankfurters which comprises stuffing a tubular casing composed of a water sensitive plastic with a sausage mix, curing and cooking the mix while enclosed in the casing and then disintegrating the plastic in water.

4. A method of producing skinless frankfurters which comprises stuffing a tubular casing of a polyvinyl alcohol with a sausage mix, curing and cooking the mix while enclosed in the casing, immersing the cured cooked frankfurter in water for a period of time sufficient to disintegrate the casing.

5. A method of producing skinless frankfurters which comprises extruding a sausage mix into a plastic tubular casing formed of a water soluble plastic, linking the casing, curing and cooking the mix while retained in the casing and then removing the casing under the action of water.

6. A method of producing skinless frankfurters which comprises extruding a sausage mix into a plastic tubular casing composed essentially of a methyl cellulose derivative, curing and cooking the mix while enclosed in the casing and removing the casing under the action of water.

7. A method of producing skinless frankfurters which comprises extruding a sausage mix into a plastic tubular casing composed essentially of a cellulosic plastic which is soluble in aqueous liquids, curing and cooking the mix while enclosed in said casing and disintegrating and removing the casing by contact with water.

8. A method of producing skinless frankfurters which comprises extruding a sausage mix into a plastic tubular casing comprised essentially of a water-insoluble, aqueous alkali soluble plastic, curing and cooking the mix while enclosed in the said casing and disintegrating and removing the casing by contacting with an aqueous alkaline solution.

9. In the production of skinless frankfurters in which the meat fill is enclosed in a casing and is cured and cooked while enclosed in the casing and the casing is manually stripped after such cooking that improvement which comprises forming the casing of a hydrolabile plastic material and automatically stripping the casing by the action of water.

10. A method of producing skinless frankfurters which comprises extruding a sausage mix into a plastic tubular casing composed essentially of a non-toxic water soluble plastic, linking the filled casing, curing and cooking the mix while it is retained in the casing subjecting the casing to the action of water under conditions selected to effect the disintegration and removal of the casing and drying the decased frankfurters.

11. A process in accordance with claim 1 in which the plastic comprises essentially plasticized polyvinyl alcohol cross linked with citric acid.

12. A process in accordance with claim 1 in which the plastic comprises essentially a water sensitive polyamide.

13. A process in accordance with claim 1 in which the plastic comprises essentially hydroxyethyl cellulose.

14. A method of producing cured meat products which comprises stuffing a hydrolabile container with a meat mix, curing and cooking the mix while retained in such container and then removing the container by the action of an aqueous fluid.

15. A method of producing shaped, cured meat products which comprises stuffing a plastic container with a meat mix, such plastic container being comprised of a hydrophobic plastic and having incorporated a hydrophilic material; curing and cooking the meat at elevated temperatures at which the material of the container is stable and retains its entity and after the cooking subjecting the product to the action of an aqueous fluid under conditions which modify the said hydrophilic material so as to disintegrate the casing and insure its ready removal from the encased meat product.

16. A method of producing skinless frankfurters which comprises stuffing, with a sausage mix, a tubular casing composed of an ethyl cellulose which is soluble in cold water but is substantially insoluble in water at temperatures of the order of about 60° F. and above, curing and cooking the mix while enclosed in the casing and subsequently disintegrating and removing the casing by contacting it with cold water.

JEAN L. LEWIS.

REFERENCES CITED

The following references are of record in the file of this patent:

UNITED STATES PATENTS

| Number | Name | Date |
|---|---|---|
| 1,964,011 | Vogt | June 26, 1934 |
| 2,216,045 | Powers et al. | Sept. 24, 1940 |
| 2,477,767 | Remer | Aug. 2, 1949 |

FOREIGN PATENTS

| Number | Country | Date |
|---|---|---|
| 386,161 | Great Britain | Jan. 12, 1933 |